United States Patent [19]

Poncha

[11] 4,285,925
[45] Aug. 25, 1981

[54] PROCESS FOR THE CONVERSION OF LIGHT ASH TO ABSORPTIVE LOW BULK DENSITY ALKALI PRODUCTS

[75] Inventor: Rustom P. Poncha, Syracuse, N.Y.

[73] Assignee: Allied Chemical Corporation, Morris Township, Morris County, N.J.

[21] Appl. No.: 934,137

[22] Filed: Aug. 16, 1978

[51] Int. Cl.$^3$ .......................... C01D 7/12; C01D 7/14; C01D 7/00
[52] U.S. Cl. .................................. 423/425; 423/422; 423/427
[58] Field of Search ................. 423/421, 427, 425, 422

[56] References Cited

U.S. PATENT DOCUMENTS

| | | | |
|---|---|---|---|
| 1,473,259 | 11/1923 | Sundstrom et al. | 423/425 |
| 1,583,661 | 5/1926 | Cocksedge | 423/425 |
| 3,235,329 | 2/1966 | Gancy | 423/425 |
| 3,485,587 | 12/1969 | Gould | 423/425 |
| 3,695,831 | 10/1972 | Goldstein | 423/425 |
| 3,701,737 | 10/1972 | Goldstein | 423/425 |
| 3,719,745 | 3/1973 | Saeman | 423/421 |
| 4,115,525 | 9/1978 | Gancy et al. | 423/427 |
| 4,151,266 | 4/1979 | Robey et al. | 423/425 |

FOREIGN PATENT DOCUMENTS 2420852  11/1974  Fed. Rep. of Germany ........... 423/425

*Primary Examiner*—Gary P. Straub
*Attorney, Agent, or Firm*—Thomas D. Hoffman; Anthony J. Stewart

[57] ABSTRACT

A method for production of absorptive particles of Wegscheider's Salt ($Na_2CO_3 \cdot 3NaHCO_3$) having low bulk density and acceptable flow properties, by reaction of anhydrous sodium carbonate particles with water and carbon dioxide is disclosed. Particles of anhydrous sodium carbonate having a bulk density less than about 750 g/l are contacted with water up to 1.55 times the stoichiometric amount of water required for the formation of sodium carbonate monohydrate. Carbon dioxide is added in two stages; in the first, the reaction zone is maintained at ambient temperatures, the second, the reaction zone is preheated and the reaction temperature is maintained at between about 90° and 105° C. until at least about 50 weight percent Wegscheider's Salt is produced. Water is added to the carbon dioxide in the second stage if less than about 1.20 times the stoichiometric amount of water is added to the particles of anhydrous sodium carbonate in the first stage and when about 1.20 to 1.55 of the stoichiometric amount of water is added to the particles of anhydrous sodium carbonate in the first stage substantially dry carbon dioxide is used in both stages.

7 Claims, 2 Drawing Figures

FIG. I

PROCESS FOR THE CONVERSION OF LIGHT ASH TO ABSORPTIVE LOW BULK DENSITY ALKALI PRODUCTS

BACKGROUND OF THE INVENTION

1. Field of the Invention

This invention relates an atmospheric pressure method for the production of free flowing particles of Wegscheider's Salt ($Na_2CO_3.3NaHCO_3$) of low bulk density from anhydrous sodium carbonate or light ash.

2. Description of the Prior Art

The production of alkali products containing $Na_2CO_3$ and $NaHCO_3$ in various weight ratios is well known in the prior art.

Co-pending application U.S. Pat. No. 4,151,266 (Robey et al.), filed June 22, 1978 discloses a single stage, superatmospheric method for the production of free-flowing particles of Wegscheider's Salt ($Na_2CO_3.3NaHCO_3$) of low bulk density from particles of anhydrous sodium carbonate of high bulk density.

Co-pending application Ser. No. 099,678 filed Dec. 3, 1979 describes a process for producing a unique Wegscheider's Salt product from sodium carbonate monohydrate wherein the monohydrate particles are contacted with a gaseous mixture containing carbon dioxide and water at atmospheric pressure. The product so produced is composed of Wegscheider's Salt needles oriented within the hexagonal crystal form of the monohydrate and has excellent flow properties. The disadvantage of this process is its requirement to employ the monohydrate as a starting material. A similar process is described in application Ser. No. 356,663 employing sodium sesquicarbonate as the starting material with a corresponding difference in the Wegscheider's Salt product. Although the product produced from the sesquicarbonate has good absorbtivity and low bulk density, the flow properties are unacceptable for certain commercial uses.

British Pat. No. 206,372 describes a process of treating sodium carbonate with a gaseous mixture of carbon dioxide and water at temperatures from 90°-100° C. to produce Wegscheider's Salt and U.S. Pat. No. 1,583,661 discloses a similar process to produce Wegscheider's Salt product composed of thin, elongated needlelike particles. In both cases the bulk density and flow properties of the product are poor.

U.S. Pat. No. 3,701,737 discloses a process of contacting sodium carbonate, sodium monohydrate or mixtures thereof with water to produce wet agglomerates; the temperatures of the charge and water are maintained above 35° to 109° C. to avoid the formation of the hepta- and decahydrate of sodium carbonate and to maintain free-water in the agglomerates. The wet agglomerates are subsequently treated with sufficient $CO_2$ at atmospheric pressure to obtain carbonated agglomerates of $NaHCO_3$ and $Na_2CO_3$ in molar ratios of 0.4:1 to 1.5:1. These carbonated agglomerates may be calcined, as described in U.S. Pat. No. 3,695,831, to form absorptive soda ash.

A process of hydrating light ash is disclosed in U.S. Pat. No. 3,719,745 wherein the free-flowing hydrated particles so produced are carbonated to saturation and thence calcined to produce low density sodium carbonate.

Due to the present environmental efforts to reduce or eliminate the phosphates present in detergents, there is a need for a product having mild alkalinity, low bulk density, low friability, good flow properties and high absorbancy of liquid surfactants. The Wegscheider's Salt compositions of Ser. No. 778,301 fill this need, and it would be desirable to produce such from commercially available soda ash.

It is accordingly one object of the present invention to provide a method for the production of an absorptive, low bulk density, alkaline material with low friability and good flow properties.

It is a further object of the invention to provide an atmospheric pressure process for converting a commercially available reactant, namely anhydrous sodium carbonate or light ash having a bulk density less than about 750 g/l into the free-flowing, alkaline Wegscheider's Salt described in Ser. No. 778,301.

These and other objects will be apparent from the description which follows.

BRIEF DESCRIPTION OF THE INVENTION

According to the present invention, there is provided in its broadest embodiment a method for the conversion of anhydrous sodium carbonate having a bulk density less than about 750 g/l into free-flowing, absorptive particles of Wegscheider's Salt, having lower bulk density, which comprises the steps of:

(a) continuously contacting said anhydrous sodium carbonate particles in a reaction zone, with between about 1.0 and 1.55 of the stoichiometric amount of water required for the formation of sodium carbonate monohydrate;

(b) agitating the exothermic reaction mixture so produced until the temperature of the dry free-flowing hydrated particles is less than about 30° C;

(c) contacting said hydrated particles with substantially moisture-free carbon dioxide gas until the absorption of said gas by said particles decreases;

(d) externally heating the particles from step (c) until the temperature thereof is at least about 85° C., while continuously contacting said particles with additional carbon dioxide gas and maintaining the reaction temperature between about 90° C. and 105° C. until the reaction mixture so produced contains at least about 50 weight percent Wegscheider's Salt particles, with the proviso that when less than about 1.20 of the stoichiometric amount of water is added to said particles in step (a), said particles from step (c) are continuously contacted with a gaseous mixture comprising from about 30 to about 75 weight percent water and from about 70 to about 25 weight percent carbon dioxide and when more than about 1.20 of the stoichiometric amount of water is added to said particles in step (a) said particles from step (c) are continuously contacted with substantially moisture-free carbon dioxide.

(e) continuously removing the product particles from said reaction zone; and (f) continuously recovering Wegscheider's Salt product particles having a free-moisture content less than about 5 weight percent.

My application Ser. No. 934,138 filed concurrently herewith discloses a similar two stage atmospheric process for the production of free-flowing particles of Wegscheider's Salt of low bulk density but particles of high bulk density anhydrous sodium carbonate, i.e., dense ash, are employed as the starting material.

DETAILED DESCRIPTION OF THE INVENTION

Figure 1:
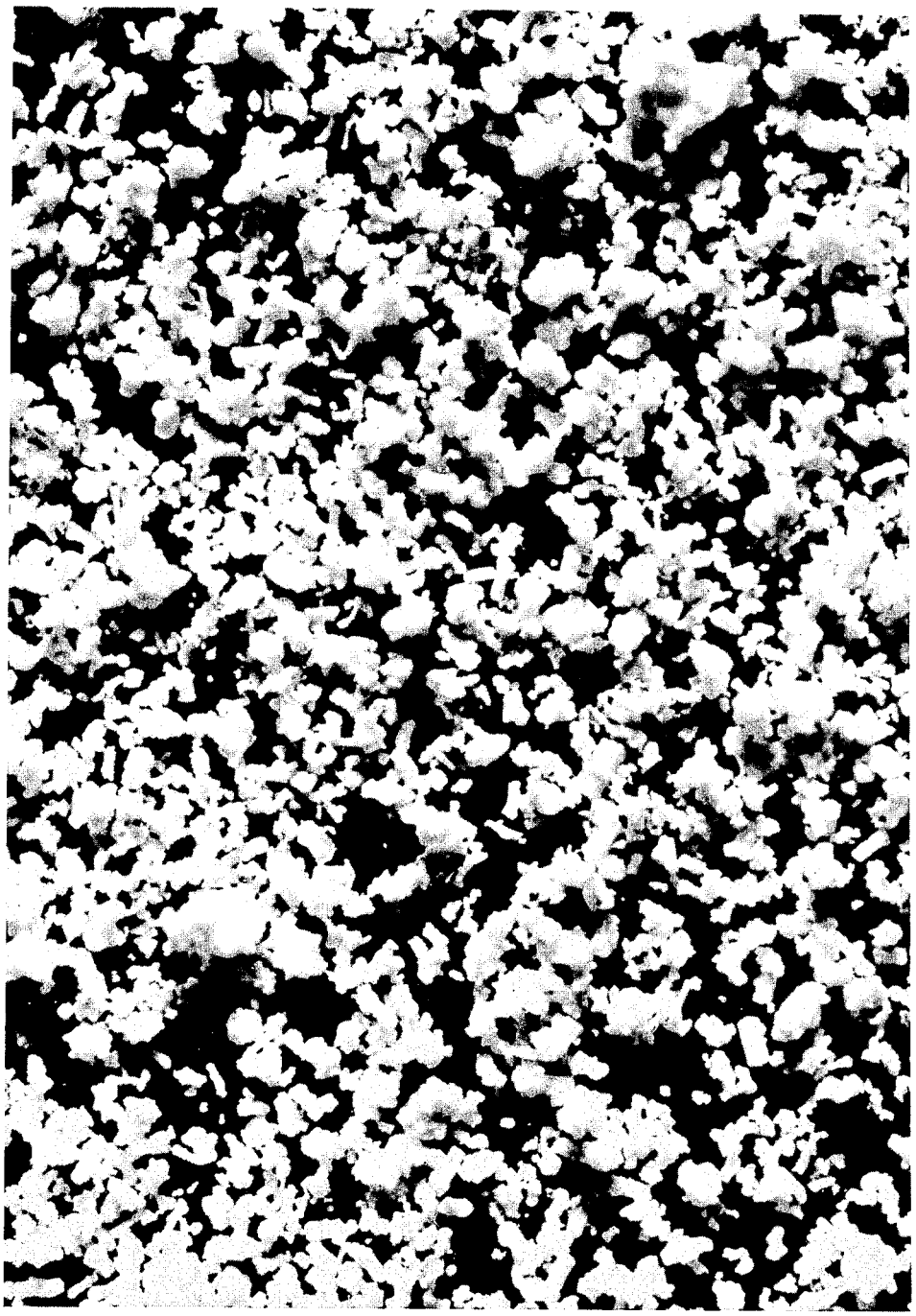
FIG. 1 is a photograph (magnification 50 X) of particles of anhydrous sodium carbonate or light ash having a bulk density of 550 g/l.
Figure 2:
FIG. 2 is a photograph (magnification 50 X) of product particles obtained from light ash by the two stage process of the instant invention (Example 2).

The process of this invention provides free-flowing absorptive particles of Wegscheider's Salt, having a low bulk density, in the range of 275–320 g/l. This two-stage process comprises contacting anhydrous sodium carbonate particles having a bulk density less than about 750 g/l usually about 550 g/l, with water in amounts ranging from about the stoichiometric amount required for sodium carbonate monohydrate formation to about 1.55 times the stoichiometric amount required. The water is introduced gradually to the charge within the reactor, e.g., through a sparger, and the heat of hydration from the exothermic reaction so produced raises the temperature of the moist mass to about 50° to about 60° C. depending on the amount of water added thereto. The mixing of the moist mass is continued until the temperature thereof decreases below 35° C., preferably below 30° C. Surprisingly it is discovered that at this point a dry, freeflowing product is formed which is thence contacted with $CO_2$ gas in two exothermic reaction steps to form free-flowing highly absorbant Wegscheider's Salt product particles having low bulk density. In the past, the hydration of sodium carbonate was performed at temperatures above 35° to 109° C. to produce a moist mass or agglomerates while avoiding the formation of the decahydrate and heptahydrate. In the present invention, hydrates in addition to the monohydrate e.g., the decahydrate and/or the heptahydrate are produced so that the hydrated sodium carbonate mixture formed is composed of dry, free-flowing particles having a definite crystalline form; no free water is present in the mixture. Destruction of particle identity through caking or agglomeration prevents the gases added thereto in later stages from reacting with individual particles. The greater the number of individual particles that are converted into Wegscheider's Salt, the lower the bulk density thereof.

The amount of water added to the anhydrous sodium carbonate particles should be carefully controlled. Production of a low density Wegscheider's product having acceptable properties requires the addition of at least the stoichiometric amount of water necessary for the formation of sodium carbonate monohydrate. If less than the stoichiometric amount of water is used, unreacted sodium carbonate would be obtained in the product and the product would not have the desired physical properties. A maximum of 1.55 times the amount of water required for monohydrate formation can be added to the anhydrous sodium carbonate or light ash. If a larger amount of water e.g., 1.77 of the stoichiometric amount required for the formation of sodium carbonate monohydrate is added, the hydrated product so produced cakes in the reactor and lumps are formed. When greater than about 1.0 but less than about 1.20 times the stoichiometric amount of water required for monohydrate formation is added to anhydrous sodium carbonate or light ash having a bulk density between 500 g/l and 750 g/l, usually about 550 g/l, humidified $CO_2$ gas is required in the second stage. When about 1.20 to 1.55 times the stoichiometric amount of water is added to the light ash in the first step and dry $CO_2$ is employed in both stages free-flowing particles of Wegscheider's Salt product, having low bulk density and high non-ionic absorbancy, are formed.

In accordance with the process of this invention, light ash or anhydrous sodium carbonate starting material, having a bulk density less than about 750 g/l, exothermally reacts with the added water to form a moist mixture of hydrates. By agitating the moist mass until the temperature drops below 35° C., preferably below 30° C., dry, free-flowing particles comprising a mixture of sodium carbonate monohydrate, heptahydrate and/or decahydrate result. While the precise composition of the moist mixture is unknown, it is essential that the temperature thereof be decreased below 35° C., preferably below 30° C; dry, free-flowing particles of crystalline product are obtained. During the first stage of the exothermic carbonation reaction, particles of the hydrated product maintained at about 25°–30° C. are intimately contacted with essentially dry $CO_2$ gas which is introduced, e.g. a sparger, situated within the reactor. The heat of reaction released by this contact raises the temperature of the charge to between 45° and 75° C. depending on the quantity of water added in the hydration step. The carbonation reaction was more exothermic when the higher amounts were employed.

It is believed that the major product in this first carbonation of hydrated light ash particles is sodium sesquicarbonate; smaller amounts of sodium bicarbonate can be present. As the temperature increases in the first carbonation stage, the $CO_2$ flow is increased since higher flows should be employed at higher temperature. During this stage there is a small increase in the volume of the charge. When the reaction rate starts to decrease, as indicated by an increase in the rate of flow of the gases exiting from the reactor and a slight decrease in the temperature of the charge, the $CO_2$ flow is decreased. Stirring is continued and external heating is applied to the reactor to maintain the temperature of the charge above about 85° C., preferably 90°–95° C. The gas composition in the second carbonation stage depends upon the amount of water used in the initial hydration step. Substantially dry $CO_2$ can be employed in the second stage if the amount of water added to the anhydrous light ash in the hydration step is between 1.20 and 1.55 times the amount required for monohydrate formation. If lesser quantities of water are added to the anhydrous dense ash in the initial hydration step, humidified $CO_2$ gas would be required in the second stage. In either event, the second stage carbonation is commenced as soon as the material temperature reaches at least 85° C., preferably 90°–95° C. During this second stage the reaction temperature of the charge is maintained at between 90° and 105° C. A gas composition of 47% $H_2O$—53% $CO_2$ obtained by passing $CO_2$ gas through water at 80° C. has been found suitable when between about 1.0 and less than 1.20 of stoichiometric water is employed in the initial hydration step.

The temperature should be carefully controlled in several stages of the process of this invention. In the hydration step, particles of dry, free-flowing hydrated sodium carbonate can only be obtained if the moist mass is stirred until the temperature drops below 35° C., preferably below 30° C. In the first carbonation stage, dry $CO_2$ gas is contacted with the particles of hydrate at this temperature. If the temperature of the particles is above 35° C. when they are contacted with the substantially dry $CO_2$, the charge immediately cakes and sticks to the walls of the reactor which prevents attainment of a free-flowing product. Prior to the start of the second carbonation stage, the temperature of the charge is raised at least about 85° C. preferably about 90°–95° C. and external heating is continued during the carbonation. If the charge is not first brought to this minimum temperature or if external heat is not applied during the carbonation reaction, coarse products having low absorbancy and relatively high bulk density are obtained. Although the carbonation reaction is exothermic, it is believed that externally heating the particles in this second stage allows the production of Wegscheider's Salt by providing a reservoir of heat which is necessary to produce that product. In any event without preheating the charge and continuing external heating, the product is unacceptable. This unacceptable product is analyzed to consist of pure sodium bicarbonate or mixtures of sodium bicarbonate and sodium sesquicarbonate.

During stages of the carbonation reaction of the process of this invention, means should be provided for intimately contacting the hydrated particles with the $CO_2$ gas. This may be accomplished by providing a motor and drive means for the reaction zone to rotate the reactor and continually force the solids therein to flow over the opening of the sparger. Alternately a series of spargers can be provided to maximize the particle-gas contact. After a contact time of about 10 minutes the reaction rate begins to increase as indicated by a slowing in the exit gas rate; the inlet gas flow is increased gradually to maintain a slow gas exit flow, until the product contained more than about 50 weight percent, preferably about 85–100 weight percent Wegscheider's Salt particles. As the reaction proceeds, the volume of the charge gradually increases and the temperature thereof reaches a maximum of about 98°–103° C. At the completion of the exothermic reaction, the temperature of the charge begins to decrease and at the same time the exit gas rate increases. The flow rates are most easily monitored by suitable gauges in the reactor's inlet and outlet gas lines and the temperature by a thermocouple or other suitable means in contact with the solid materials within the reaction zone.

The product is discharged, screened to remove oversize and undersize material and thence air-dried at room temperature or in a forced-air oven at 35°–40° C. until free-flowing Wegscheider's product particles containing less than 5 weight percent free-water are obtained.

Product containing more than 5 weight percent free-water should be dried as soon as it is discharged from the reactor, preferably vibrated in a current of dry air in an oven at a temperature between 35° and 40° C., to minimize chemical and physical degradation. The drying process was continued until the product contains less than about 5 weight percent of free-water. The product is then transferred to a vibratory screen to remove undersize and oversize particles. A vibrating dryer-cooler of any suitable design can be employed.

Upon discharge from the reactor, the particles of Wegscheider's Salt can contain relatively large amounts of free-water. This free-water is exclusive of the chemically bound water present in $Na_2CO_3.NaHCO_3.2H_2O$. If this product is not dried to lower the free-water content to 5 weight percent or less, Wegscheider's Salt can decompose to give sodium sesquicarbonate and sodium bicarbonate according to the equation:

$$2H_2O + Na_2CO_3.3NaHCO_3 \rightarrow Na_2CO_3.NaHCO_3.2H_2O + 2NaHCO_3$$

Particles of Wegscheider's Salt product containing about 5 weight percent free-water maintain their chemical and physical integrity.

EXPERIMENTAL METHODS

Product Characteristics

Chemical Composition:

X-ray crystallography is employed to determine the chemical composition of the product which is reported as weight percent. Typically the product contains more than 85 weight percent Wegscheider's Salt. Sodium bicarbonate and sodium sesquicarbonate may also be present. The analysis are accurate to ±5 weight percent.

Bulk Density:

The bulk density (BD) of light ash starting material is in the range of 450–650 g/l, typically about 55 g/l (34.4 lbs/ft$^3$) and measured by a method described in U.S. Pat. No. 3,944,500. Bulk densities of the products prepared from light ash ranged from about 290–310 g/l (18.1–19.4 lbs/ft$^3$), depending upon the reaction conditions as well as the speed and method of drying.

Absorbancy:

The non-ionic absorbancy (A) is a measure of the amount of a non-ionic surfactant or wetting agent which can be added to a known weight of product before the mixture so produced becomes tacky and loses its free-flowing properties. The absorbancy (A) is defined as:

$$A = \frac{\text{Weight of Wetting Agent}}{\text{Weight of Product}} \times 100\%$$

Typical values of absorbancies for products from light ash ranged from 44–55%. The absorbancy for light ash starting material was 44%.

Pore Volume:

The pore volumes (PV) of the products as measured on pore sizes in the range of 0.035 to 12 microns by the mercury intrusion technique described in co-pending application Ser. No. 356,663, filed May 2, 1973, were considerably greater than the pore volumes of the light ash starting material. The pore volumes of products prepared from light ash (PV=0.56 ml/g) were in the range of about 0.62–0.70 ml/g. Although pore volumes of the product varied widely, generally products having higher pore volumes had higher absorbancy values.

Flow Number:

The flow quality of a sample of product is a measure of its ability to flow through openings of $\frac{1}{8}''$ and larger. Each successive opening is $\frac{1}{8}''$ larger than the previous one. A flow number (FN) of product which flowed through an opening of $\frac{1}{8}''$ is designated as 1; the flow number of light ash was 8; products prepared from light ash have flow numbers of 9–11, depending on the reaction conditions. Lower values signify an acceptable product.

Friability:

Friability is defined as the sum of two other quantities, breakage and attrition. A −10 +80 mesh portion of a sample is placed on a 100 mesh screen with glass beads. A 140 mesh screen and pan are placed underneath. After vibration the portion of the sample passing through 100, and standing on the 140 mesh screen is reported as "% breakage". The portion passing through 140 mesh is called "% attrition". The sum of the two quantities is called friability. The friabilities of products prepared from light ash were in the range of about 4.5–14%. Lower values designate an acceptable product.

Screen Analysis:

Products prepared from light ash were considerably coarser than their precursors, as indicated by the results in Table 1 below.

TABLE I

Screen Analysis of Products From Light Ash

| Screen (U.S. mesh) | Product From Light Ash (% retained on screen) | Light Ash (% retained on screen) |
|---|---|---|
| −10 + 40 | 5.6 | 2.2 |
| −40 + 60 | 11.6 | 2.9 |
| −60 + 100 | 39.2 | 12.0 |
| −100 | 43.6 | 82.9 | pH at 25° C:

The pH of a 1 weight percent aqueous solution of light ash in water at 25° C. was 11.0. The pH of an aqueous solution, 1 weight percent in Wegscheider's Salt product was lower and varied from 9.50–9.70 depending upon the composition of the product.

EXAMPLES 1–3

Examples 1

In this Example light ash was hydrated with about 1.03 times the stoichiometric amount of water required for the formulation of the monohydrate. Water, 35 g., was added with thorough mixing to 200 g of light ash. The heat of hydration raised the temperature of the mass to about 40° C. and a moist product was formed. Mixing was continued until the temperature of the product decreased to below about 30° C. and a dry, free-flowing product was obtained. The product was transferred to a 1 liter indented, glass round bottom flask to facilitate mixing during flask rotation. The flask, equipped with a thermocouple sufficient to measure the temperature of the charge, gas inlet and outlet lines, was attached to a modified rotary evaporator apparatus. A rotameter between the $CO_2$ gas cylinder and inlet line measured the rate of gas flow; the outlet line was dipped into a beaker of water to measure the exit gas rate. During an experiment, the gas flow was adjusted to have a slow stream of exit gas.

The flask containing the charge was rotated and the $CO_2$ gas flow started at 200–250 ml/minute. The temperature of the charge began to increase and at the same time the gas flow also had to be increased to maintain a slow stream of exit gas. At the end of about 30 minutes the temperature of the charge was about 45° C. and the gas flow was maintained at about 100–250 ml/minute. There was a small increase in volume of the charge. The reaction rate started to decrease as shown by an increase in the rate of exit gas and a slight drop in temperature of the charge. At this point the flask was placed in an oil bath maintained at about 95° C. and the $CO_2$ flow adjusted to about 350 ml/minute to maintain a slow exit gas stream. As soon as the temperature of the charge reached about 85° C., the dry $CO_2$ gas was replaced by humidified gas, by passing it through a series of two gas washing bottles (equipped with coarse glass frit spargers) containing water maintained at 80° C., giving a gas composition of 53% weight percent $CO_2$ and 47 weight percent $H_2O$. The gas flow was adjusted to about 350 ml/minute to maintain a slow exit gas stream. After about 10 minutes the reaction rate began to increase as shown by the slowing down of exit gas. The gas flow was gradually increased to 1000 ml/minute to maintain a slow exit gas stream. The volume and the temperature of the charge gradually increased to 102° C. The temperature of the charge then began to decrease and at the same time the exit gas rate increased. When the temperature of the charge had decreased to about 95° C., the gas flow had to be decreased to about 500 ml/minute. The expanded charge filled about ¾ of the flask volume. The gas flow was stopped, the product removed from the flask and dried in air at room temperature. After drying, the product was passed through a 10 mesh screen to remove any lumps. Less than about 5 weight percent of product was removed as lumps. The product contained a mixture of 95 weight percent Wegscheider's Salt and 5 weight percent sodium bicarbonate, had a bulk density of 285 g/l and a flow number equal to 11. By methods described hereinabove, the product had a pore volume of 0.62 g/ml and a non-ionic absorbancy of 44%.

Example 2

This Example illustrates a preferred embodiment of the two stage system of the present invention and utilizes the specific criteria discovered for this process.

50 grams of water, 1.47 times the stoichiometric amount required for the formation of sodium carbonate monohydrate, were added with thorough mixing to 200 grams of light ash. Mixing was continued until the temperature of the charge decreased below about 30° C. and a dry, free-flowing product resulted. Lumps, if formed, were broken up and the whole mass was passed through a 50 mesh screen into a indented glass round bottom flask which was thence attached to the modified rotary evaporator described in Example 1 above. Rotation was begun and the dry $CO_2$ gas was contacted with the particles. When the charge reached a maximum temperature of 72° C., the $CO_2$ gas flow was about 1200 ml/min. The flask was thence placed in an oil bath, heated to a temperature of 95° C.; the dry gas flow rate continued at a lower rate of about 500 ml/min. The reaction rate again started to increase and the gas flow had to be increased to about 1000 ml/min. The maximum temperature of the charge in the second stage was about 103° C. When the temperature of the charge decreased to about 96° C., the gas flow had to be reduced to about 400–500 ml/min. At this point, the product occupied greater than about ¾ of the flask volume. The gas flow was stopped and the product dried as in Example 1. The product contained 95 weight percent Wegscheider's Salt and 5 weight percent sodium bicarbonate; the bulk density was 308 g/l and the flow number was 9. The non-ionic absorbancy of the product was 55% and the pore volume was 0.70 g/ml.

Example 3

In this Example light ash having a bulk density of 520 g/l was preheated to a temperature of 95° C. in an apparatus described in Examples 1 and 2 and contacted with $CO_2$ humidified by passing the gas through water heated to 85° C. Considerable lumping and sticking occurred in the reactor; no volume expansion was observed even after 90 min. and the reaction was ended.

The product was dried as described in Examples 1 and 2, screened to remove lumps and analyzed. Although the product contained 100% Wegscheider's Salt, it did not possess acceptably high absorbance or low bulk density. In fact the bulk density of the product was 640 g/l, higher than the light ash starting material. The non-ionic absorbancy of the product was 21%, lower than the light ash starting material.

We claim:

1. A method for the conversion of anhydrous sodium carbonate particles having a bulk density between about 500 and 650 g/l, into free-flowing, absorptive particles of Wegscheider's Salt, having a bulk density between about 275 and 320 g/l, which comprises the steps of:
    (a) continuously contacting said anhydrous sodium carbonate particles, in a reaction zone, with between greater than about 1.0 and not more than about 1.20 of the stoichiometric amount of water required for the formation of sodium carbonate monohydrate;
    (b) agitating the exothermic reaction mixture so produced until the temperature of the dry free-flowing hydrated particles is less than about 35° C.;
    (c) contacting said dry hydrated particles having a temperature of no more than about 35° C. with substantially moisture-free carbon dioxide gas whereby the exothermic nature of the contact causes the temperature of the contacted particles to exceed 35° C. and continuing said contact until the rate of absorption of said gas by said particles decreases;
    (d) externally heating the particles from step (c) until the temperature thereof is at least about 85° C., while continuously contacting said particles with a gaseous mixture comprising from about 30 to 75 weight percent water and from about 70 to about 25 weight percent carbon dioxide and maintaining the reaction temperature between about 90° and 105° C. until the reaction mixture so produced contains at least about 85 weight percent Wegscheider's Salt product;
    (e) continuously removing the product particles from said reaction zone; and
    (f) continuously recovering the Wegscheider's Salt product particles having a free-moisture content of less than about 5 weight percent.

2. A method as described in claim 1 wherein in step (d) the gaseous mixture contains about 47 weight percent water and about 53 weight percent carbon dioxide.

3. A method as described in claim 1 wherein in step (f) the particles of Wegscheider's product are dried in a current of forced air at a temperature between 35° C. and 40° C. until the free-flowing content of the product particles is less than about 5 weight percent.

4. A method as described in claim 1 wherein in step (d) the particles from step (d) are externally heated to a temperature between 90°–95° C.

5. A method for the conversion of anhydrous sodium carbonate particles having a bulk density between about 500 and 650 g/l into free-flowing absorptive particles of Wegscheider's Salt, having a bulk density between about 275 and 320 g/l, which comprises the steps of:
    (a) continuously contacting said anhydrous sodium carbonate particles, in a first reaction zone, with between about 1.20 and about 1.50 of the stoichiometric amount of water required for the formation of sodium carbonate monohydrate;
    (b) agitating the exothermic reaction mixture so produced until the temperature of the dry, free-flowing hydrated particles is less than about 35° C.;
    (c) contacting said dry hydrated particles from step (b), having a temperature of no more than about 35° C., with substantially moisture-free carbon dioxide gas whereby the exothermic nature of the contact causes the temperature of the particles to exceed 35° C. and continuing said contact until the rate of absorption of said gas by said particles decreases;
    (d) externally heating the particles from step (c) until the temperature thereof is at least about 85° C., while continuously contacting said particles with substantially moisture-free carbon dioxide gas and maintaining the reaction temperature between about 90° and 105° C. until the reaction mixture so produced contains at least about 85 weight of percent particles of Wegscheider's Salt product;
    (e) continuously removing the product particles from said reaction zone; and
    (f) continuously recovering Wegscheider's Salt product particles having a free-moisture content of less than about 5 weight percent.

6. A method described in claim 5 wherein in step (d) the particles from step (c) are externally heated to a temperature between 90° C. and 95° C.

7. A method as described in claim 5 wherein in step (f) the particles of Wegscheider's product are dried in a current of forced air at a temperature between about 35° C. and 40° C. until the free-moisture content of the product particles is less than about 5 weight percent.

* * * * *